United States Patent
Diverdi et al.

(10) Patent No.: US 11,107,257 B1
(45) Date of Patent: Aug. 31, 2021

(54) SYSTEMS AND METHODS OF GENERATING PLAYFUL PALETTES FROM IMAGES

(71) Applicant: ADOBE INC., San Jose, CA (US)

(72) Inventors: Stephen Diverdi, San Jose, CA (US); Jose Ignacio Echevarria Vallespi, San Jose, CA (US); Jingwan Lu, San Jose, CA (US)

(73) Assignee: ADOBE INC., San Jose, CA (US)

(*) Notice: Subject to any disclaimer, the term of this patent is extended or adjusted under 35 U.S.C. 154(b) by 303 days.

(21) Appl. No.: 16/052,480

(22) Filed: Aug. 1, 2018

(51) Int. Cl.
| | |
|---|---|
| *G06T 11/00* | (2006.01) |
| *G06T 7/50* | (2017.01) |
| *G06T 7/90* | (2017.01) |
| *G06K 9/62* | (2006.01) |
| *G06F 3/048* | (2013.01) |
| *G06F 3/0484* | (2013.01) |

(52) U.S. Cl.
CPC .......... *G06T 11/001* (2013.01); *G06K 9/6223* (2013.01); *G06K 9/6251* (2013.01); *G06T 7/50* (2017.01); *G06T 7/90* (2017.01); *G06F 3/04847* (2013.01); *G06T 2200/24* (2013.01)

(58) Field of Classification Search
CPC combination set(s) only.
See application file for complete search history.

(56) References Cited

U.S. PATENT DOCUMENTS

| | | | |
|---|---|---|---|
| 7,180,524 B1* | 2/2007 | Axelrod | G09G 5/02 345/593 |
| 7,502,033 B1* | 3/2009 | Axelrod | G09G 5/06 345/440 |
| 8,487,963 B1 | 7/2013 | Harris et al. | |
| 9,147,378 B2 | 9/2015 | Shekey | |
| 2007/0008560 A1 | 1/2007 | Eschbach | |
| 2012/0099784 A1* | 4/2012 | Marchesotti | G06F 16/5838 382/162 |

(Continued)

OTHER PUBLICATIONS

Peter Vandoren et al., "IntuPaint: Bridging the Gap Between Physical and Digital Painting", IEEE, 2008, pp. 65-72.

(Continued)

*Primary Examiner* — Wesner Sajous
(74) *Attorney, Agent, or Firm* — Shook, Hardy & Bacon L.L.P.

(57) ABSTRACT

Disclosed herein are embodiments of systems and computer-implemented methods for extracting a set of discrete colors from an input image. A playful palette may be automatically generated from the set of discrete colors, where the playful palette contains a gamut limited to a blend of the set of discrete colors. A representation of the playful palette may be displayed on a graphical user interface of an electronic device. In a first method, an optimization may be performed using a bidirectional objective function comparing the color gamut of the input image and rendering of a candidate playful palette. Initial blobs may be generated by clustering. In a second method, color subsampling may be performed from the image, and a self-organizing map (SOM) may be generated. Clustering the SOM colors may be performed, and each pixel of the SOM may be replaced with an average color value to generate a cluster map.

20 Claims, 14 Drawing Sheets

(56) References Cited

U.S. PATENT DOCUMENTS

| | | | |
|---|---|---|---|
| 2014/0111539 A1* | 4/2014 | Allen | G06T 11/001 |
| | | | 345/594 |
| 2014/0237429 A1* | 8/2014 | Abrahami | G06T 11/001 |
| | | | 715/835 |
| 2014/0267189 A1* | 9/2014 | Moll | G06F 3/03545 |
| | | | 345/179 |
| 2017/0008560 A1* | 1/2017 | Kyrtsos | B62D 13/06 |
| 2019/0304141 A1* | 10/2019 | Shugrina | G06T 11/001 |
| 2019/0355155 A1* | 11/2019 | Shugrina | G06T 11/001 |

OTHER PUBLICATIONS

Ghita Jalal et al., "Color Portraits: From Color Picking to Interacting with Color", Proceedings of the ACM International Conference on Human Factors in Computing Systems, 2015, 11 pages.

Bill Baxter et al., "DAB: Interactive Haptic Painting with 3D Virtual Brushes", Proceedings of the 28th Annual Conference on Computer Graphics and Interactive Techniques, 2001, 8 pages.

Barbara J. Meier et al., "Interactive Color Palette Tools", IEEE Computer Society, May/Jun. 2004, pp. 64-72.

* cited by examiner

SYSTEMS AND METHODS OF GENERATING PLAYFUL PALETTES FROM IMAGES

CROSS REFERENCE TO RELATED APPLICATIONS

This application is related to U.S. Non-Provisional application Ser. No. 15/589,223, filed May 8, 2017, which is hereby incorporated by reference in its entirety.

TECHNICAL FIELD

This application relates generally to computer-based image processing, and specifically to generating playful color palettes from input images.

BACKGROUND

Playful palettes combine the benefits of a traditional media painter's palette with non-destructive capabilities of digital tools. Playful palettes are described in more detail in application Ser. No. 15/589,223, which is incorporated herein by reference in this application. A playful palette, like a traditional media painter's palette, allows a user to mix various colors in different proportions to generate variety of color shades. The playful palette, as a digital tool, is non-destructive, where a playful palette preserves all of the current and past color mixes as readily accessible and revertible history. With an infinitely editable, non-destructible wide color gamut, playful palettes have therefore provided a significant improvement to digital color pickers and color picking interfaces.

However, a fundamental difficulty of a "blank canvas" still remains. While a playful palette may allow artist to select and edit colors, there are no user-available tools in the art to generate a playful palette in the first place. In other words, playful palettes may have to be constructed from scratch or from a blank canvas. When artists find inspiration from images or photographs, the artists have to rely upon trial and error to generate a color combination that may reflect the color gamut of the images and photographs. For example, a color palette for painting a landscape portrait is to have landscape colors, such as green variations for grass, brown variations for trees, gray variations for rocks, yellow variations for sunlight, and blue variations for water and sky. There is, therefore, a wide disconnect between playful palettes and existing images that may provide an inspiration to generate playful palettes.

As such, a significant improvement upon methods and systems for generating playful palettes is needed to support and improve the efficiency of the artistic process.

SUMMARY

What is therefore desired are systems and methods to generate playful palettes from user provided images. What is further desired are systems and methods that generate playful palettes from user provided images in a reasonable amount of time.

Embodiments disclosed herein may solve the aforementioned problem and may provide technical solutions to other problems, as well. In an illustrative embodiment, a computer may receive an input image and generate a playful palette reproducing the color gamut of the input image. In one illustrative method, the computer may execute an iterative closed loop optimization algorithm to minimize an objective function encoding bi-directional similarity between the input image color (e.g., RGB) gamut and corresponding playful palette color (e.g., RGB) gamut. To generate an initial playful palette, the computer may extract the colors of the input image and perform a k-means clustering on the extracted colors. The computer may then generate overlapping color blobs with average colors of the clusters forming the initial playful palette. The computer may start the closed-loop iteration by performing a bi-directional comparison of the pixels from a rendering of the initial playful palette and the pixels in the input image. The computer may iteratively change the position or color of at least one color blob for a plurality of iterations until the computer determines that the objective function is minimized. The computer may then output the set of color blobs that minimize the objective function as the playful palette corresponding to the input image.

In another method, the computer may receive an input image, and extract the colors from the input image. From the extracted colors, the computer may generate a self-organizing map. The self-organizing map may include a continuous two-dimensional (2D) distribution of the extracted colors representing a three dimensional (3D) volumetric agglomeration of the colors in the input image. The computer may perform a k-means clustering of the colors in the self-organizing map. The output of the k-means clustering may be a set of colors from the inputs assigned to each cluster and the average color for each cluster. The computer may then iterate through the pixels of the self-organizing map and assign the pixel the average color of the corresponding cluster. The computer may generate a cluster map from such assignment. The computer may then find a pixel coordinate for each cluster centroid in the cluster map. The computer may then perform a Delaunay triangulation of the cluster positions to generate a connected graph wherein every cluster centroid may be a vertex and the adjacent clusters may have an edge connecting them. The computer may, in turn, convert these clusters to color blobs forming a playful palette corresponding to the input image.

In an embodiment, a computer-implemented method comprises: extracting, by a computer, a set of discrete colors from an input image; automatically generating, by the computer, a playful palette from the set of discrete colors, the playful palette containing a gamut limited to a blend of the set of discrete colors; and displaying, by the computer, a representation of the playful palette on a graphical user interface.

In an embodiment, a computer-implemented method comprises extracting, by a computer, a set of discrete colors from an input image; performing, by the computer, clustering on the set of discrete colors to generate a set of color clusters with corresponding average color values; generating, by the computer from the set of color clusters, an initial set of color blobs each having the average color value of the respective color cluster; iteratively comparing, by the computer, bidirectional color differences between pixels of the input image with pixels of an initial playful palette formed by the initial set of color blobs to iteratively evaluate an objective function comparing color gamuts of the input image and the initial playful palette, each iteration including: modifying, by the computer, a position or a color of at least one color blob of the respective set of color blobs to generate a new set of color blobs forming a new playful palette in response to the computer determining that a respective set of color blobs do not minimize the objective function; and outputting, by the computer, the respective set of color blobs as a playful palette corresponding to the input image in response to the computer determining that the respective set of color blobs minimizes the objective function.

In another embodiment, a computer-implemented method comprises extracting, by a computer, a set of colors from an input image; generating, by the computer, a self-organizing map from the set of colors; performing, by the computer, k-means clustering on the self-organizing map to generate a set of color clusters with corresponding average color values; replacing, by the computer, color values of pixels in the self-organizing map with color values of a corresponding color cluster of the set of color clusters to generate a cluster map; triangulating, by the computer, the clusters in the cluster map such that distances between pixel coordinates of the centroids of clusters are approximately equal; and generating, by the computer, a set of color blobs forming a playful palette by assigning the color values of the clusters in the cluster map to the set of color blobs and positioning the set of color blobs at the triangulated pixel coordinates of the centroids of the clusters.

In yet another embodiment, a system comprises a non-transitory storage medium storing an input image; a processor coupled to the non-transitory storage medium and programmed to execute a set of instructions to: extract a set of discrete colors from the input image; perform clustering on the set of discrete colors to generate a set of color clusters with corresponding average color values; automatically generate a playful palette from the set of discrete colors, the playful palette containing a gamut limited to a blend of the set of discrete colors; and display a representation of the playful palette on a graphical user interface.

BRIEF DESCRIPTION OF THE DRAWINGS

The accompanying drawings constitute a part of this specification and illustrate embodiments of the subject matter disclosed herein.

DETAILED DESCRIPTION

Figure 1:
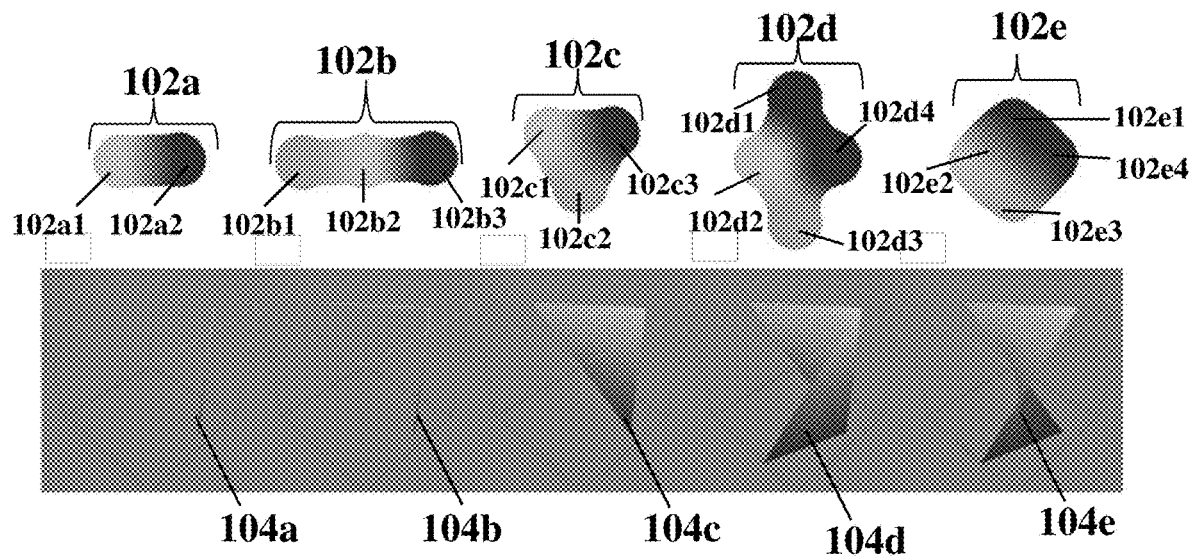
FIG. 1 shows color blobs forming a playful palette and corresponding color gamuts, according to an embodiment.

Digital tools have allowed artists an enormous flexibility for content creation. Artists are able to experiment with various color combinations digitally without the inconvenience of laborious physical color creation and mixing. Playful palettes, which combine the benefits of a traditional media painter's palette with non-destructive capabilities of digital tool, provide a powerful platform for artists to create digital art. However, the "blank canvas" problem remains to be solved. An artist can have a hard time creating content from a blank, clean document—a blank canvas—at a computer screen. Furthermore, when artists find inspirations from digital images, such as photographs, there are no tools to digitally reproduce the color gamut in the images. Conventional tools merely choose discrete colors from images.

Described herein are embodiments of systems and methods that generate a playful palette representing the color gamut of a user-provided input image. For example, if an artist is inspired by a digital image (or digital photograph) of a mountain and wants to generate a painting using similar colors, embodiments disclosed herein may generate a playful palette containing colors of the photograph. To generate the playful palette, a computer executes an optimization method or an approximation method that generates a more accurate playful palette. In some instances, the approximation method may be faster than the optimization method, but with less accuracy.

In the optimization method, the computer may extract colors from an input image and perform k-means clustering on the extracted colors to generate an initial set of color blobs. Starting from the initial set of color blobs, the computer may iteratively evaluate an objective function encoding a bi-directional similarity of the color gamut of the input image. In each iteration, the computer may change at least a color value (e.g., RGB color value) of a color blob or a position of the color blob until the objective function is minimized. The computer may then generate a playful palette from the set of color blobs and their respective positions that minimize the objective function.

In the approximation method, the computer may subsample colors from the input image, selecting colors of non-zero histogram bins of a three dimensional histogram of the colors in the input image. The computer may generate a self-organizing map from the subsampled colors. The computer may then perform k-means clustering on the colors of the self-organizing map to generate a set of color clusters. Iteratively traversing through the self-organizing map, the computer may replace the pixel colors of the self-organizing map with the colors of the corresponding cluster to generate a cluster map. In the cluster map, the computer may identify the coordinates of the centroids for each cluster. The computer may perform a Delaunay triangulation such that a distance between the centroids of the clusters is approximately equal. After the triangulation, the computer may generate a playful palette with color blobs with color values of the corresponding color clusters and positions based upon the triangulated position of the corresponding cluster centroids.

FIG. 1 shows illustrative playful palettes 102a-102e (collectively referred to as palettes 102) and the corresponding illustrative RGB color gamuts 104a-104e (collectively referred to as 104) in three dimensional (3D) domains. Playful palette 102a may include two overlapping color blobs (also referred to herein as "blobs") 102a1, 102a2, which may create a smooth linear gradient between the blobs 102a1 and 102a2 thereby generating a line RGB color gamut 104a in a 3D domain. Playful palette 102b may include three overlapping blobs, wherein blobs 102b1, 102b2 and blobs 102b2, 102b3 overlap each other. These two overlaps may generate an RGB color gamut 104b with two straight lines in a 3D domain. Playful palette 102c may include three overlapping blobs 102c1, 102c2, 102c3. Using barycentric coordinates for interpolation; the three overlapping blobs may generate an RGB color gamut 104c with a triangle shape. Playful palette 102d may include four overlapping blobs 102d1, 102d2, 102d3, 102d4. These four overlapping blobs may be decomposed into two sets of triples of overlapping blobs: 102d1, 102d2, 102d4 and 102d2, 102d3, 102d4 so as to generate an RGB color gamut 104d containing two planar triangles in 3D. Playful palette 102e may contain four blobs 102e1, 102e2, 102e3, 102e4 that may overlap with each other simultaneously, thereby generating an RGB color gamut 104e containing a curved surface in 3D. In general, the playful palettes 102 may generate a corresponding RGB gamut 104 as a 2D manifold (including lines, planes, and/or curves) in a 3D domain. Each of the playful palettes 102 may be configured to be customized by the user by changing the positions of the corresponding color blobs to generate a desired color shade.

Figure 2:
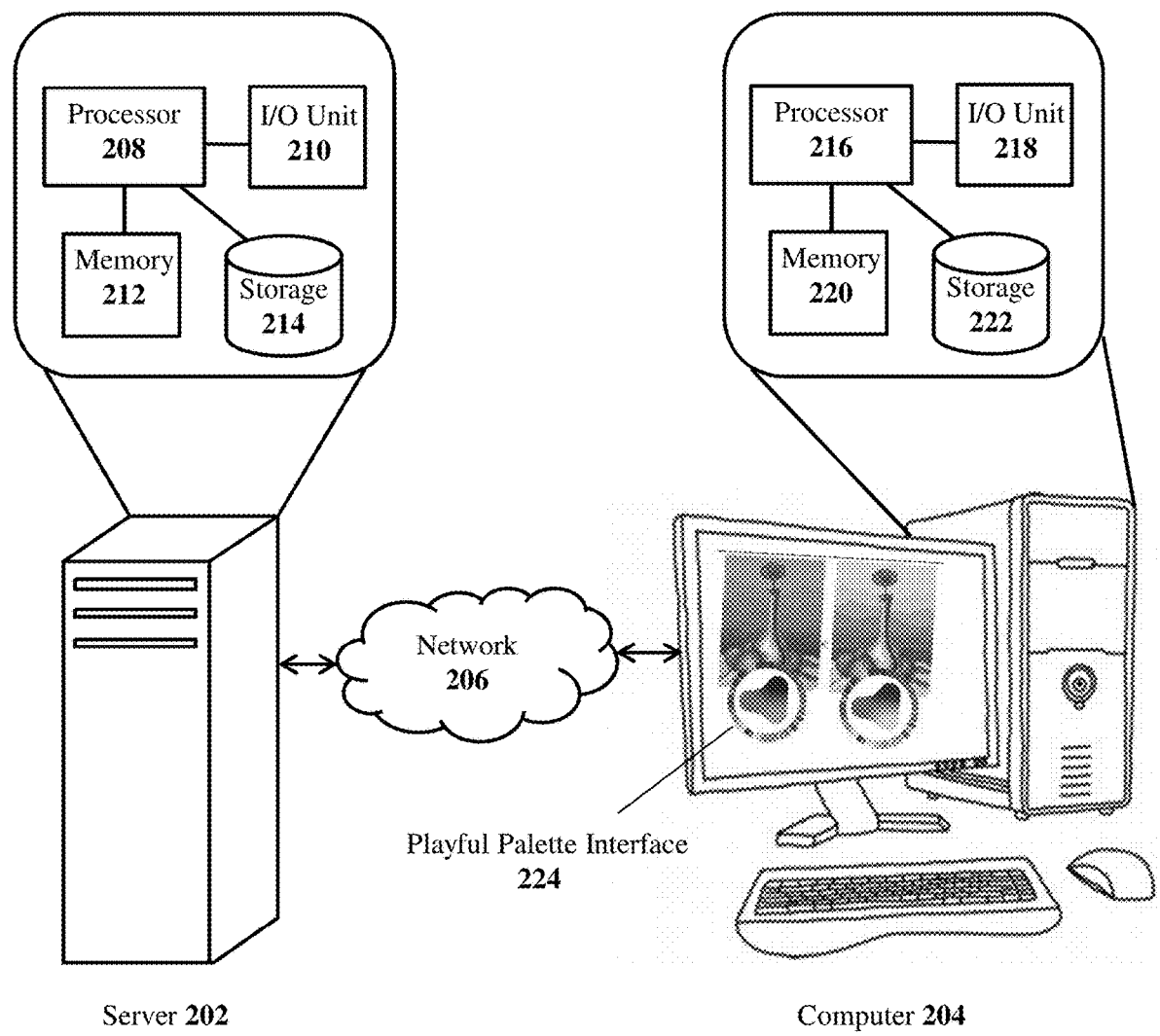
FIG. 2 shows a network environment for generating a playful palette from an input image, according to an embodiment.

FIG. 2 shows a network environment 200 for generating a playful palette from an input image, according to an embodiment. The network environment 200 may comprise a server 202 and a client computer 204 interconnected by a network 206. It should be understood that listed components of the network environment 200 are merely illustrative, and additional, substitute, or lesser number of components should be considered within the scope of this disclosure. For example, the computer 204 could be a tablet or other computing device.

The server 202 may include a processor 208, an input output (I/O) unit 210, a memory 212, and storage 214. The processor 208 may include any type of processor that may implement one or more instruction sets to enable the processing functionality of the server 202. The I/O unit 210 may communicate with the client computer 204 and/or other computers through the network 206. The memory 212 may be any type of non-transitory memory from which the processor 208 may read input instructions and input data, and to which the processor 208 write output instructions and output data. For instance, the memory 212 may be a random access memory (RAM), cache memory, and/or virtual memory implemented by the operating system of the server 202 utilizing a portion of the storage 214. The storage 214 may any type of electronic storage, such as a hard drive, to store the software modules used by the processor 208 to generate a playful palette from an input image.

The network 206 may be any type of network implementing one or more communication protocols between the server 202 and the client computer 204. Examples of the network 206 include, but are not limited to, Local Area Network (LAN), Desk Area Network (DAN). Wireless Local Area Network (WLAN), Metropolitan Area Network (MAN). Wide Area Network (WAN), and the Internet. The communication over the network 106 may be performed in accordance with the one or more communication protocols, such as Transmission Control Protocol and Internet Protocol (TCP/IP), User Datagram Protocol (UDP), and IEEE communication protocols.

The client computer 204 may be any kind of computer that includes a processor 216, an I/O unit 218, a memory 220, and a storage 222. The processor 216 may include any type of processor that may implement one or more instruction sets to enable the processing functionality of the computer 204. The I/O unit 218 may communicate with the server 202 and/or computers through the network 206. The storage 222 may store software modules for generating and displaying a playful palette interface 224. The playful palette interface 224 may display a representation of a playful palette generated from an input image.

The functionality of generating a playful palette may be implemented by the server 202 and/or the computer 204. The playful palette may be generated by the server side processor 208, the client side processor 216, or a combination of operations of the server side processor 208 and the client side processor 216. Regardless of the implementation, one or more of the processors 208, 216 may receive an input image and execute an optimization method or an approximation method to generate a playful palette from the input image. In the optimization method, one or more of the processors 208, 216 may: (i) extract colors from the input image, (ii) perform a k-means clustering on the extracted colors to generate an initial set of overlapping color blobs (also referred to herein as "blobs") forming an initial playful palette, (iii) starting from the initial playful palette, iteratively evaluate a bidirectional similarity objective function until the objective function is minimized, and/or (iv) generate a playful palette from a set of blobs that minimize the objective function. In the approximation method, one or more of the processors 208, 216 may: (i) generate a two dimensional (2D) self-organizing map (SOM) of colors from the colors subsampled from input image; (ii) perform a k-means clustering on the colors of the SOM, (iii) replace pixels in the SOM with color of the corresponding cluster, (iv) identify pixel coordinate for each cluster centroid, and/or (v) perform a Delaunay triangulation of the cluster positions (using the pixel coordinates of each cluster centroid) to generate a set of blobs forming a playful palette.

Figure 3:
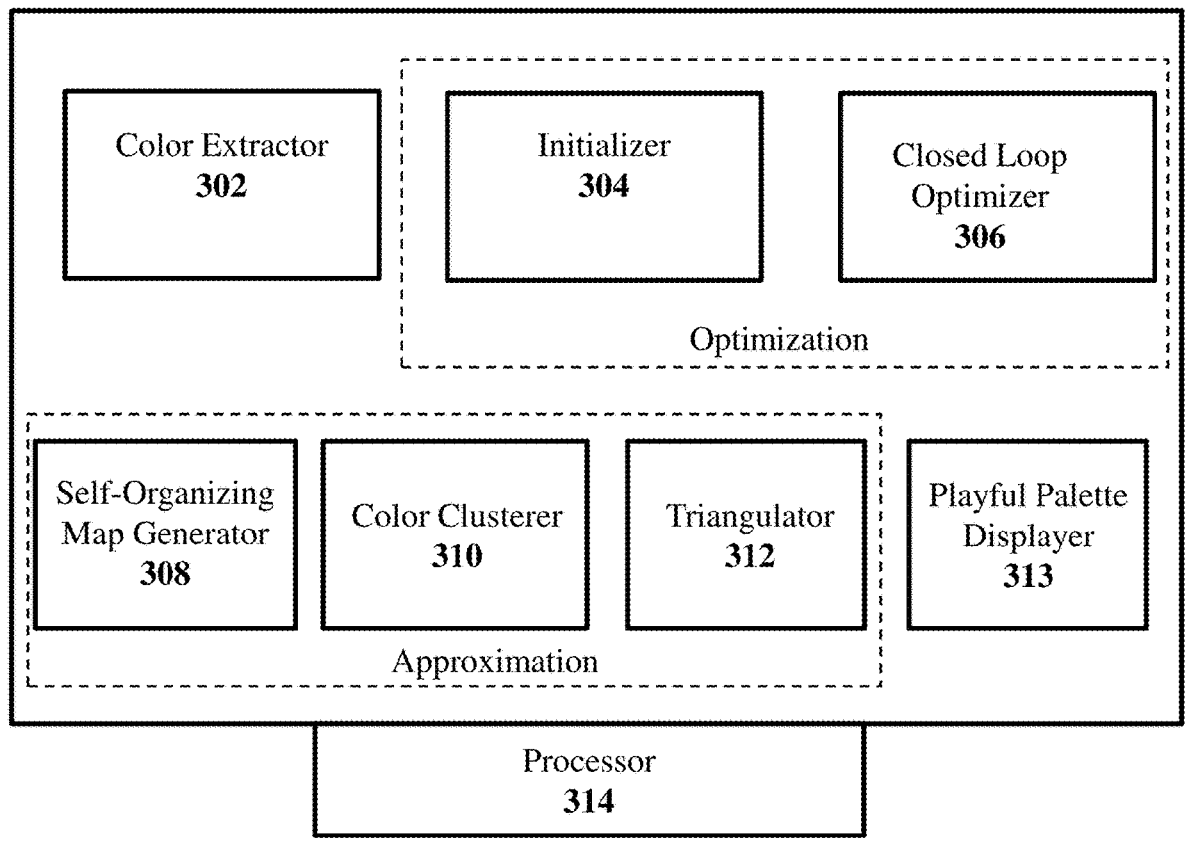
FIG. 3 shows a block diagram of software modules for generating a playful palette from an input image, according to an embodiment.

FIG. 3 is a block diagram showing software modules 300 implementing one or more processes described throughout this disclosure. A processor 314 may execute the software modules 300. The software modules 300 may include a color extractor module 302, an initializer module 304, a closed loop optimizer module 306, self-organizing map generator module 308, a color clusterer module 310, a triangulator module 312, and a playful palette displayer module 313. The processor 314 may execute the initializer module 304 and the closed loop optimizer module 306 to perform an optimization method of generating a playful palette. The processor may execute the self-organizing map generator module 308, the color cluster module 310, and the triangulator module 312 to perform an approximation method of generating a playful palette. The processor 314 may execute the playful palette displayer module 313 to display a representation of a playful palette generated by either of the optimization method and the approximation method.

The color extractor module 302 may extract the colors in an input image (e.g., contained in one or more pixels of an image) provided by the user. The color extractor module 302 is a color picker configured to pick up identify or select discrete colors in an image. In some embodiments, the color extractor module 302 may extract a subsample of the colors in the input image by selecting colors of non-zero histogram bins in a 3D histogram of the input image. The initializer module 304 may generate an initial set of color blobs forming an initial playful palette. To generate the initial set of color blobs, the initializer module 304 may perform k-means clustering on the colors extracted from the image, wherein k=number of color blobs, either selected by the user or by the processor 314, in the playful palette corresponding to the image. The initial set of color blobs generated by the initializer module 304 may be overlapping. The closed loop optimizer module 306 may iteratively evaluate a bidirectional objective function until a minimum is reached. More specifically, in each iteration, the closed loop optimizer module 306 may change color and/or position of at least one color blob and evaluate the objective function.

The self-organizing map generator module 308 may generate a self-organizing map from the extracted colors of the image. A self-organizing map is a type of artificial neural network (ANN) training using unsupervised learning to produce low-dimensional (e.g., 2D) discretized representation of the input space of training samples. In some embodiments, the self-organizing map generator module 308 may generate the self-organizing map from a subsample of colors extracted from the image. The color clusterer module 310 may perform k-means clustering on the colors of the self-organizing map to form clusters of colors. The color clusterer module 310 may further replace each pixel in the self-organizing map with the color of a corresponding color. The triangulator module 312 may identify the centroid of each cluster and triangulate the centroids such that the centroids may be connected by the edges of approximately equal length, where being approximately equal may be within a few millimeters, a few pixels, or not visually perceptible. In some embodiments, the triangulator module 312 may perform a Delaunay triangulation.

The software modules 300 may be stored in a non-transitory storage medium of system, such as one or more of the memories 212, 220 and one or more of storages 214, 222 of FIG. 2. The non-transitory storage medium may also store an input image, such as a digital photograph or video frame. The processor 314 (e.g., processors 208, 216 in FIG. 2) may be electrically coupled to the non-transitory storage medium. The processor 314 may be programmed to execute a set of instructions in the software modules 300 to extract a set of discrete colors from the input image. The processor 314 may further execute the set of instructions to perform clustering on the set of discrete colors and generate a set of color clusters with corresponding average color values. The processor 314 may further execute the set of instructions to automatically generate a playful palette from the set of discrete colors, the playful palette containing a gamut limited to a blend of the set of discrete colors. Additionally, the processor may execute the set of instructions to display a representation of the playful palette on a graphical user interface.

In operation, the processor 314 may execute a computer-implemented method that includes extracting a set of discrete colors from an input image. A playful palette may be automatically generated from the set of discrete colors, where the playful palette contains a gamut limited to a blend of the set of discrete colors. A representation of the playful palette may be displayed on a graphical user interface of an electronic device.

It should be understood that the respective functionality of the aforementioned software modules is merely illustrative and similar functionality may be achieved by fewer, more, or different software modules. Furthermore, the software modules described herein may achieve alternative and additional functionality, which should be considered to be within the scope of this disclosure.

Figure 4:
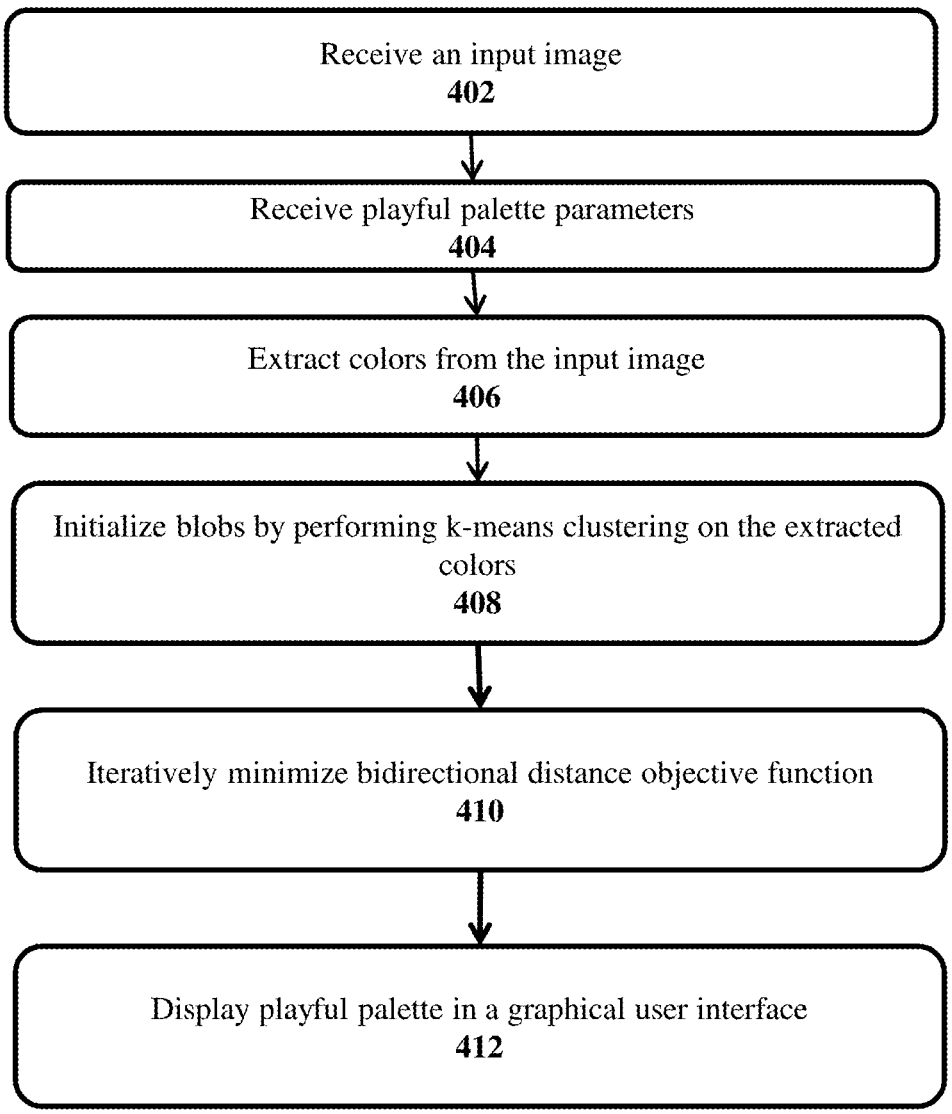
FIG. 4 shows a flow diagram of a first illustrative method of generating a playful palette from an input image, according to an embodiment.

FIG. 4 shows a flow diagram 400 of a first illustrative method of generating playful palettes from an input image, according to an embodiment. Although multiple computers, multiple software modules, and multiple databases may implement one or more steps of the method, this description details, for brevity, the steps being implemented by a computer. Furthermore, the steps shown in the flow diagram 400 are merely illustrative, and additional steps or alternative steps should be considered within the scope of this disclosure. Furthermore, one or more of the steps may be skipped during the implementation of the method.

The method may begin at step 402, where the computer may receive an input image. The input image may be in any format including, but not limited to, Joint Photographic Experts Group (JPEG), Bitmap (BMP), Tagged Image File Format (TIFF), Portable Document Format (PDF), and/or Portable Network Graphics (PNG). The input image may be a digital photograph taken by a camera or a manually-generated digital image. The computer may receive the input image from a user or another software application. For example, the computer may provide a graphical user interface (GUI) containing an upload tool for the user to provide the input image to the computer. As another example, the computer may provide an application programming interface (API) for another software application or module to provide the input image to the computer.

At step 404, the computer may receive playful palette parameters. The user may, for example, may specify the number of color blobs to be generated by the computer. The user may also specify the one or more radii of the blobs. In some embodiments, the user may provide a single radius for each of the blobs to be generated by the computer. In other embodiments, the user may provide multiple radii corresponding to various sizes of the blobs to be generated by the computer. Furthermore, the user may specify distances or degrees of overlaps between the blobs. In some instances, the computer may not receive playful palette parameters from the user and may use default parameters.

The computer may then generate a playful palette using the input image using the parameters, user provided or default, by executing steps 406, 408, and 410 below. These steps directed to the computer minimizing an objective function (also referred to as a loss function) to generate the playful palette. The objective function may capture the bidirectional similarity (sometimes also referred to as bidirectional distance) between the colors in the input image and the corresponding playful palette, as detailed below. In particular, the computer may execute an initialization step 408 and an iterative optimization step 410 to minimize the objective function detailed herein.

For optimization, a state vector x for the blobs in the playful palette to be generated may be defined as:

$$x=\{r_1,g_1,b_1,u'_1,v'_1,r_2,g_2,b_2,u'_2,v'_2\ldots r_n,g_n,b_n,u'_n,v'_n\}$$

For each blob, there may be five variables: (i) three variables representing the color of the blob {r, g, b} and (ii) two variable representing the position of the blob {u, v}. Therefore, for n blobs, there may be 5n variables. For example, if n is chosen to be 8, there may be 40 (or 5*8) variables. Therefore, for n=8, state vector x may have 40 dimensions. In this illustrative embodiment, the computer may allow the user to select n (as described in step 404), thereby controlling the number of blobs in a playful palette generated by the computer. In some embodiments, the computer may optimize on $$u' = \frac{u+1}{2}$$

and $$v' = \frac{v+1}{2}$$

such that all the variables in the state vector x may have a value in a range of [0,1]. In some embodiments, the user may select one or more radii (as described in step 404) for the one or more blobs. In other embodiments, the computer may select default radii for the one or more blobs. For example, the computer may select a constant blob radius of 0.3 in normalized coordinate units. In some embodiments, the computer may optimize the radii of the blobs. In these embodiments, each blob may have an additional radius parameter (R) for optimization. Therefore, each blob may have six variables: {r, g, b, u, v, R}.

In the playful palette, the computer may render the state vector x as $I_x=g(x)$, where $I_x$ may be a rendered image of the playful palette as defined by the state vector x. Therefore, an objective function for minimization may be $f(x)=d(I, I_x)$, where I may be the input image, $I_x$ may be the rendered playful palette image for the state vector x, and d may be a function that computes bidirectional distances (to measure the bidirectional similarity) between I and $I_x$ as follows:

$$d(I, I_X) = \alpha \left( \frac{1}{|I|} \sum_{p \in I} \min_{q \in I_x} \|p_{RGB} - q_{RGB}\|^2 \right) +$$

$$(1-\alpha) \left( \frac{1}{|I_X|} \sum_{q \in I_x} \min_{p \in I} \|p_{RGB} - q_{RGB}\|^2 \right)$$

For an image pixel p, $p_{RGB}$ may be the color triplet {r, g, b} for that pixel. The first sum in the above function may compute how well each image pixel is represented by the playful palette, while the second sum may penalize colors in the playful palette that are not in the image. The α parameter may allow a tuning for the relative strength of these sums. For example, for α=0.5, the computer may weigh each sum equal. For α=1, the computer may ignore the penalty for palette colors that are not in the image. In an embodiment, the α may be 0.9.

The objective function (or loss function) capturing the bidirectional similarity between the input image and the corresponding playful palette may fulfill two conditions. First, for every color in the input image, there may have to be a similar color in the playful palette. This condition may ensure that the playful palette may accurately reproduce the input image colors such that the user can select among them. Second, for every color in the playful palette, there may have to be the same or similar color in the input image. This second condition may ensure that the playful palette does not include any or many colors (e.g., more than a specific value or percentage) that are not in the input image, which may be unnecessarily distracting. The second condition may also avoid a trivial solution of a playful palette that reproduces all possible colors.

At step 406, the computer may extract colors from the input image, using a color extraction method. At step 408, the computer may initialize blobs by performing k-means clustering on the extracted colors. More specifically, for an initial color of the blobs, the computer may implement a k-means clustering, with k being equal to the number of blobs to be generated by the computer as a part of the playful palette. For each cluster, the computer may calculate the average RGB color combination and assign the average RGB color to a corresponding blob. Furthermore, the computer may initialize all blobs as overlapping. In other words, the computer may set for each blob, u=0.5 and v=0.5. The computer may also initialize the blobs based on a user parameters, such as a radius for the blobs.

K-means clustering for initialization was found to be an appropriate initialization for the objective function $f$ The nature of the objective function $f$ means that there may be large portions of the search space (i.e., combination of blobs) with zero or near zero gradients, which may make the optimization difficult. For example, with two blobs, if the blobs are far apart, then small changes in u or v for either blob may not change the achieved gamut because it will not change the connectivity (i.e., overlapping) of the blobs. In these cases, the blobs may not move closer during the optimization and may fail to create a linear or triangular portion in the output gamut. K-means clustering was used for initialization to avoid this problem. K-means clustering may be used to assign initial colors to the blobs. Furthermore, the optimization algorithm may find it difficult to move two distant blobs together, but may move two overlapping blobs apart more easily. Therefore, overlapping blobs with colors assigned by K-means clustering may be used for initialization. For example, the computer may set initial positions of all blobs to 0.5, 0.5 as described above.

At step 410, the computer may iteratively minimize bidirectional distance objective function $f$ For example, the computer may implement Nelder-Mead simplex algorithm. It should be understood that the Nelder-Mead simplex algorithm is merely an example, and the computer may use any other derivative-free optimization method, such as the Covariance Matrix Adaptation Evolution Strategy (CMA-ES) algorithm. To improve the performance when computing the $f$, i.e., $d(I, I_x)$, the computer may render a playful palette image $I_x$ at a lower resolution, for example, a resolution of 48*48 pixels. As described above, the computer may also subsample the input image I with a 3D histogram. In some embodiments, the computer may use 16*16*16 uniform RGB histogram bins in the 3D histogram to store the pixel colors of the input image I. From the 3D histogram, the computer may select and consider the colors of non-zero histogram bins. Therefore, for computing $f$ the computer may have approximately 1000 pixels from each of input image I and the playful palette rendering $I_x$. However, it should be understood that the aforementioned example for improving performance is merely illustrative and a full-fledged bidirectional comparison or any other approximation thereof should be considered within the scope of this disclosure. The computer may iteratively execute step 410 until the computer reaches a desired minimum for the objection function $f$. Once the desired minimum is reached, the computer may execute step 412 to display the output the corresponding blobs as a playful palette for the input image in a graphical user interface. The displayed playful palette may include overlapping blobs representing the color gamut of the input image. The computer may allow the user edit the playful palette for achieving various color combinations.

Figure 5:
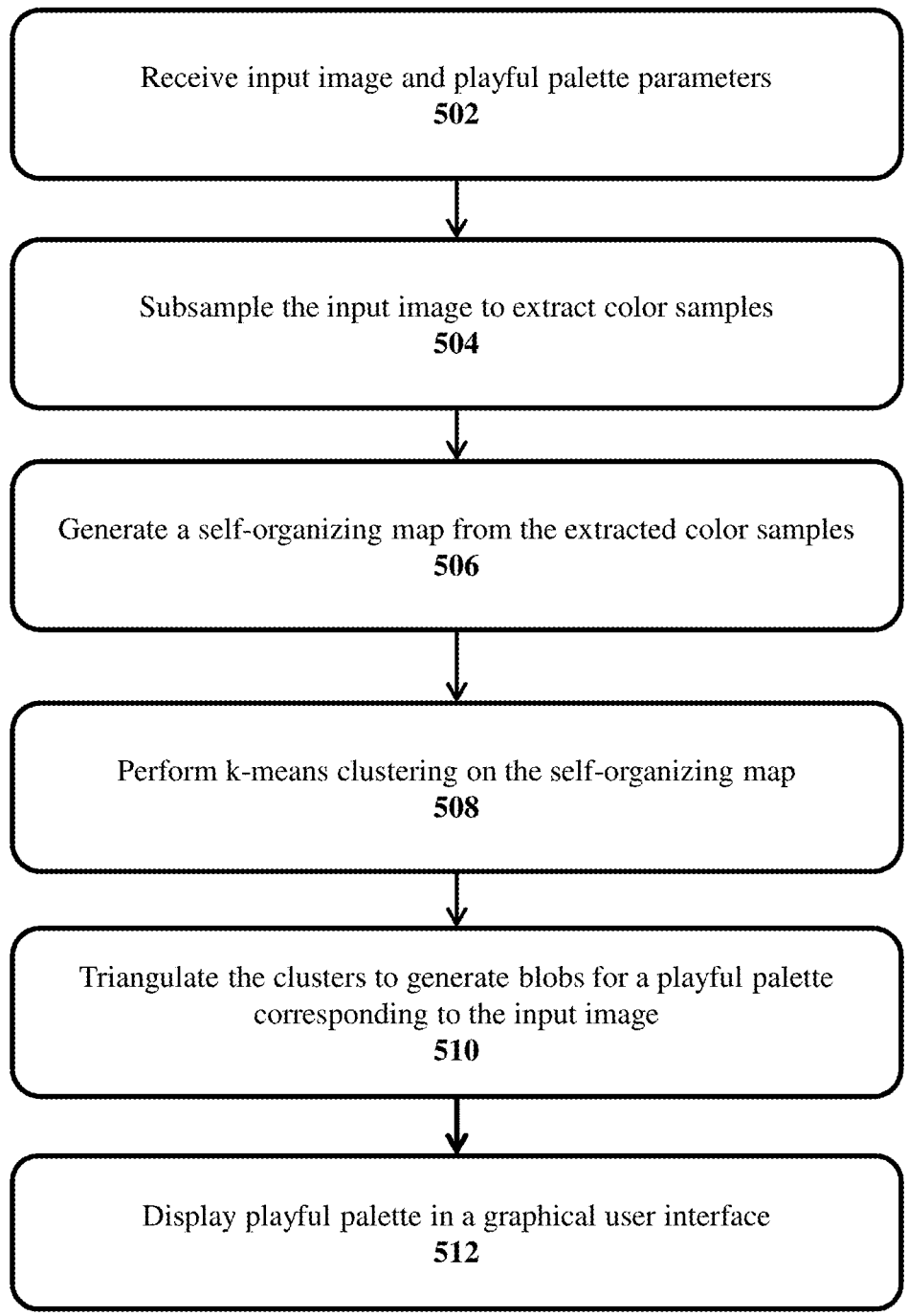
FIG. 5 shows a flow diagram of a second illustrative method of generating a playful palette from an input image, according to an embodiment.

FIG. 5 shows a flow diagram 500 of a second illustrative method of generating playful palettes from an input image, according to an illustrative embodiment. Although multiple computers, multiple software modules, and multiple databases may implement one or more steps of the method, this description details, for brevity, the steps being implemented by a computer. Furthermore, the steps shown in the flow diagram 500 are merely illustrative, and additional steps or alternative steps should be considered within the scope of this disclosure. Furthermore, one or more of the steps may be skipped during the implementation of the method.

The method may begin at step 502, where the computer may receive an input image and playful parameters. The input image may be in any format including, but not limited to Joint Photographic Experts Group (JPEG), Bitmap (BMP), Tagged Image File Format (TIFF), Portable Document Format (PDF), and/or Portable Network Graphics (PNG). The input image may be a digital photograph taken by a camera or a manually sketched image. The computer may receive the input image from a user or another software application. For example, the computer may provide a graphical user interface (GUI) containing an upload tool for the user to provide the input image to the computer. As another example, the computer may provide an application programming interface (API) for another software application or module to provide the input image to the computer. In some embodiments, the computer may also receive playful palette parameters. The user may, for example, may specify the number of blobs to be generated by the computer. The user may also specify the one or more radii of the blobs. In some embodiments, the user may provide a single radius for each of the blobs to be generated by the computer. In other embodiments, the user may provide multiple radii corresponding to various sizes of the blobs to be generated by the computer. Furthermore, the user may specify distances or degrees of overlaps between the blobs. In some instances, the computer may not receive playful parameters from the user and may use default parameters.

At step 504, the computer may subsample the input image to extract color samples. In some embodiments, the computer may subsample the input image as non-zero bins of a uniform 16*16*16 three-dimensional (3D) histogram on the RGB color cube. In other words, the computer may select non-zero elements in the 16*16*16 3D histogram of the input image.

At step 506, the computer may generate a self-organizing map (SOM) from the extracted color samples. The SOM, also known as Kohonen maps that are a type of artificial neural network, as previously described, may reduce the dimensionality of the extracted color samples. More specifically, the SOM may include, for a three-dimensional (3D) volumetric cloud of samples, a two-dimensional (2D) manifold defined by vertices and local edge connectivity. In some embodiments, the computer may generate an SOM of 32*32 nodes from extracted colors.

At step 508, the computer may perform k-means clustering on the self-organizing map. In other words, the computer may have the SOM containing a 2D continuous distribution of colors representing the input image, and from the SOM, the computer may have to select a discrete set of colors for output blobs. By executing a k-means clustering, the computer may generate a target number of clusters from the SOM, assigning each cluster with a single color. As an input to generate the k-means clusters, the computer may pass in the RGB colors in the self-organizing map as 3D points. In doing so, the computer may ignore the spatial arrangement of the colors as a property of the clustering step. By performing the k-means clustering, the computer may generate a plurality of clusters, where each cluster is associated with an average color (e.g., RGB color).

At step 510, the computer may triangulate the clusters to generate blobs for a playful palette corresponding to the input image. The output of the k-means clustering of step 508 may be a set of RGB colors from the input assigned to each cluster and the average RGB color for each cluster. The computer may iterate through the pixels of the 2D manifold from the self-organizing map, and for each pixel, assign the color of the cluster to which the pixel belongs. In other words, the computer may replace the colors of the pixels of the self-organizing map with the colors of the corresponding clusters. For each cluster, the computer may identify a pixel coordinate for the cluster centroid. These positions and colors may be the basis for the blobs of the playful palette corresponding to the input image. However, if the computer converted to the position and color values to blobs, then adjacent blobs may not necessarily overlap, which may unnecessarily limit the resultant color gamut. The computer may therefore have the blobs touching when their corresponding clusters are spatially adjacent to include their mixture to the output gamut.

To achieve the overlapping of the blobs, the computer may compute a Delaunay triangulation of the cluster positions to generate a connected graph, where every cluster position may be a vertex and adjacent clusters may have an edge connecting the clusters. For example, if the output palette has a blob radius of 0.3, set by a user or by the computer, two blobs may overlap to form a pleasing gradient when their distance is approximately 0.45. Therefore, the computer may position the vertices such that each edge is approximately 0.45 in length. To achieve the requisite edge lengths, the computer may iteratively update the position of the vertices. For a single 2D vertex position v, the update equation may be:

$$v' = v + \beta \frac{1}{|\Omega|} \sum_{u \in \Omega} \frac{t}{\|u - v\|}(u - v),$$

where $\Omega$ may be the set of vertex positions adjacent to v, t may be the target distance, and $\beta$ may a rate parameter. In an illustrative embodiment, the computer may use $\beta=0.1$, with a maximum of 500 iterations and a convergence threshold of 0.0001. The computer may also, for each iteration, scale the vertex positions so that their bounds are the unit circle to avoid growing or shrinking.

Therefore, after executing the triangulation step 510, the computer may have a plurality of overlapping blobs forming a playful palette corresponding to the input image. The computer may then execute step 512 to display the playful palette in a graphical user interface.

Figure 6:
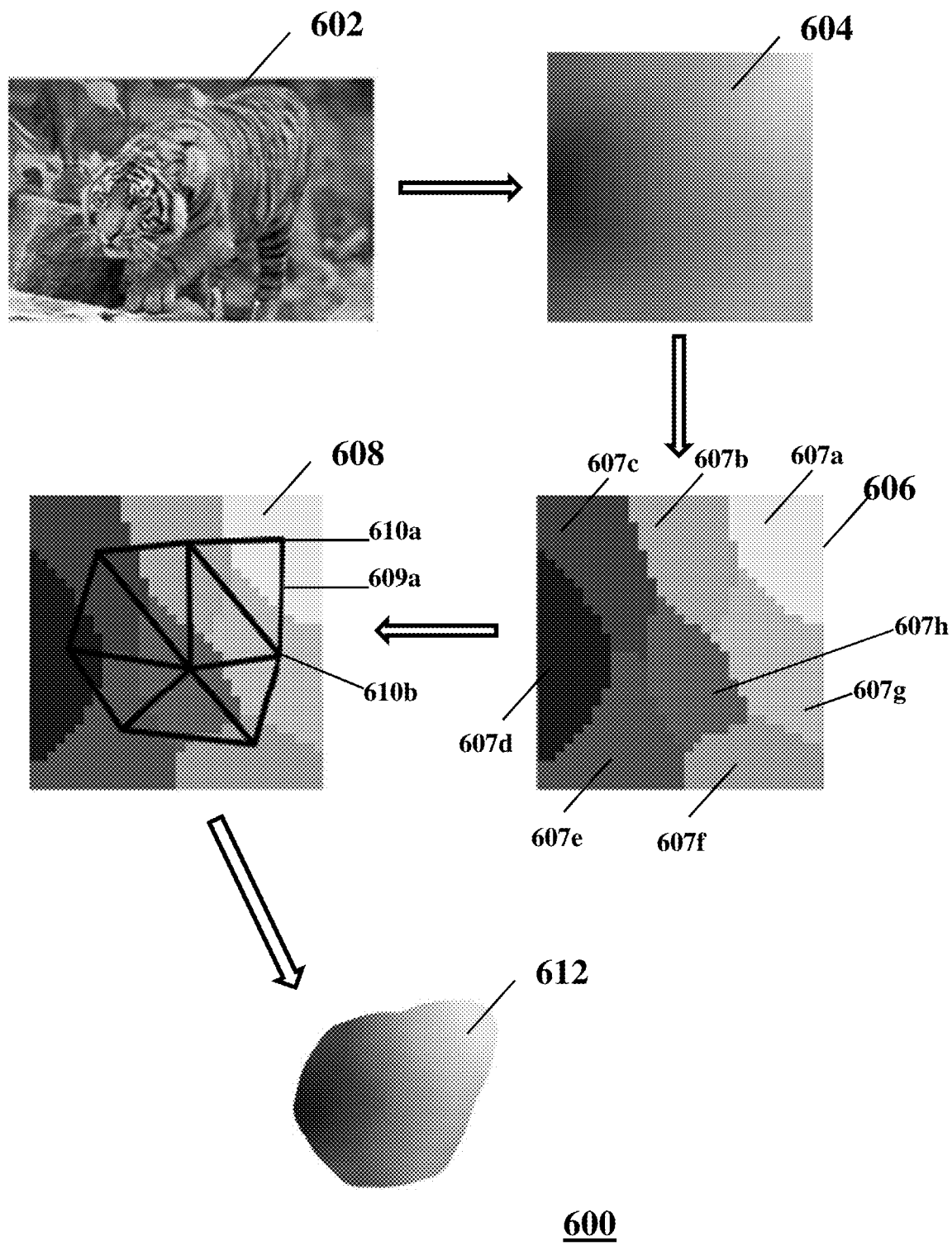
FIG. 6 shows a process diagram of the second illustrative method of generating a playful palette from an input image, according to an embodiment.

FIG. 6 shows an illustrative process diagram 600 for generating a playful palette from an input image, according to an illustrative embodiment. A computer may execute an approximation algorithm to generate the playful palette from the input image. As shown herein, the computer may receive an input image 602. From the input image 602, the computer may generate a 32*32 self-organizing map (SOM) 604. The computer may then perform a k-means clustering on the SOM 604 to generate a cluster map 606. The cluster map 606 may include clusters 607a-607g (collectively referred to as 607), where each cluster may have a discrete color. To achieve a mixing (or blending) of colors, the computer may then perform a cluster triangulation, as shown in 608 such that the edges (an example shown as 609a) connecting cluster centroids (examples shown as 610a, 610b) are approximately equal in length. A centroid can represent a center of mass of a geometric object of uniform density. Based on the cluster triangulation, the computer may generate a playful palette 612. Therefore, at the end of the process, the computer may generate a playful palette 612 based on colors in the input image 602.

Figure 7:
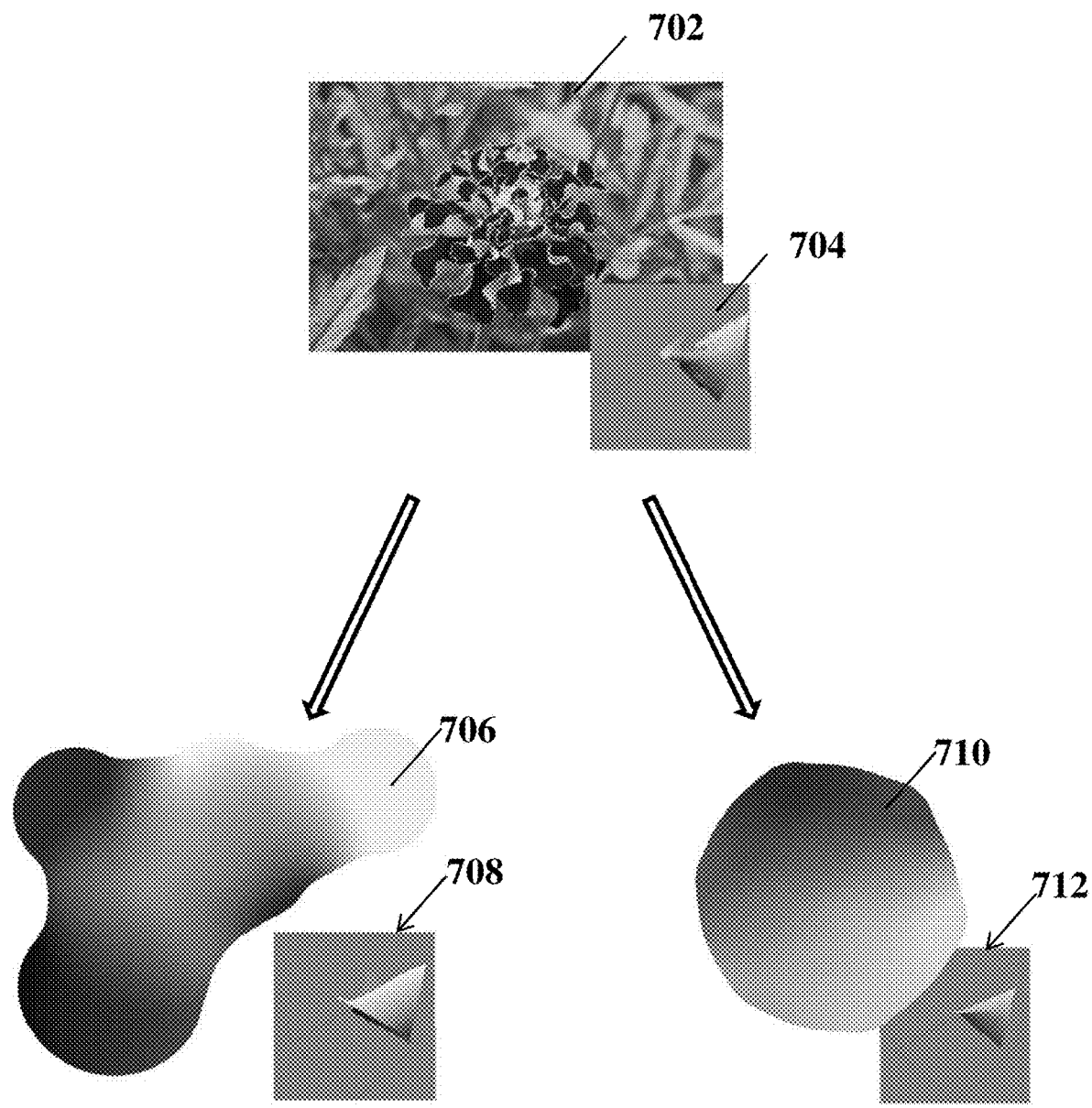
FIG. 7 shows playful palettes generated by the first and second illustrative methods, according to an embodiment.

FIG. 7 shows an illustrative image 702 with a corresponding RGB color gamut 704. FIG. 7 further shows a first illustrative playful palette 706 with a corresponding three dimensional (3D) RGB color gamut 708 generated using an optimization method from the image 702 and a second illustrative playful palette 710 generated using an approximation method from the image 702. It should be understood that additional and/or alternative playful palettes and RGB color gamuts may be generated using other computational methods. It should also be understood that other color format palettes, such as four color CYMK, may also be utilized.

Figure 8:
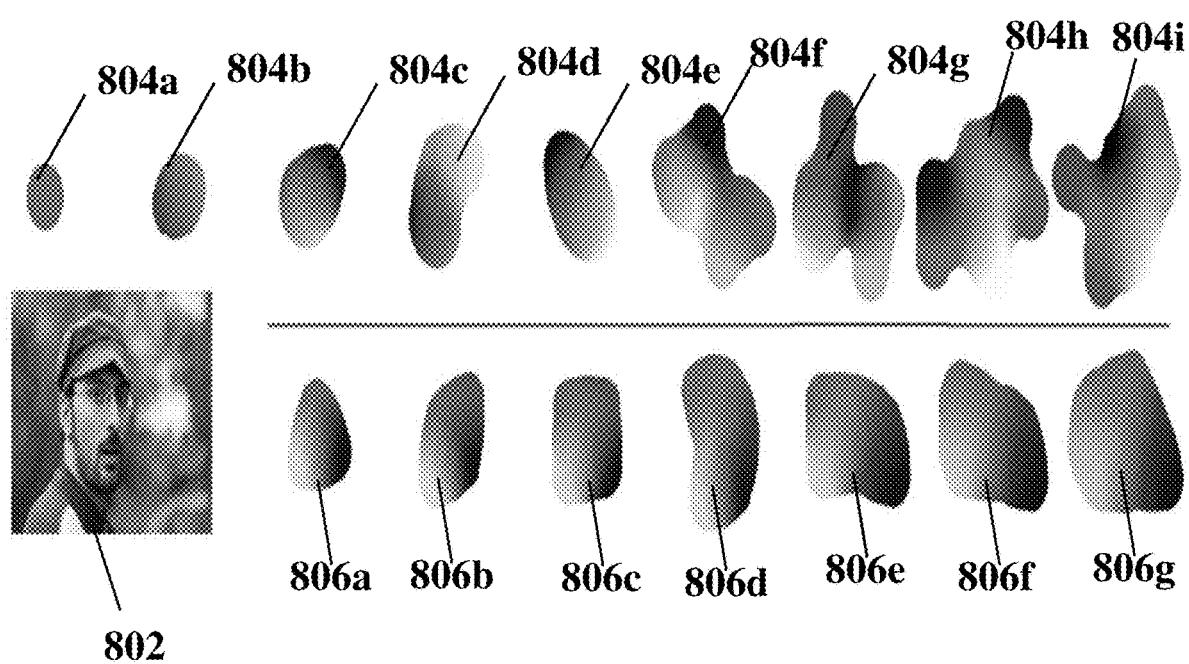
FIG. 8 shows playful palettes with differing number of color blobs generated by the first and second illustrative methods, according an embodiment.

FIG. 8 shows an illustrative image 802, the corresponding playful palettes 804a-804i (collectively referred to as 804) generated by an optimization method, and corresponding palettes 806a-806g (collectively referred to as 806) generated by an approximation method. In the playful palettes 804 generated by the optimization method: playful palette 804a may include one color blob, playful palette 804b may include two color blobs, playful palette 804c may include three color blobs, playful palette 804d may include four color blobs, playful palette 804e may include five color blobs, playful palette 804f may include five color blobs, playful palette. 804g may include six color blobs, playful palette 804h may include eight color blobs, and playful palette 804i may include nine color blobs. In the playful palettes 806 generated by an approximation method: playful palette 806a may include three color blobs, playful palette 806b may include four color blobs, playful palette 806c may include five color blobs, playful palette 806d may include six color blobs, playful palette 806e may include seven color blobs, playful palette 806f may include eight color blobs, and playful palette 806g may include nine color blobs.

Figure 9:
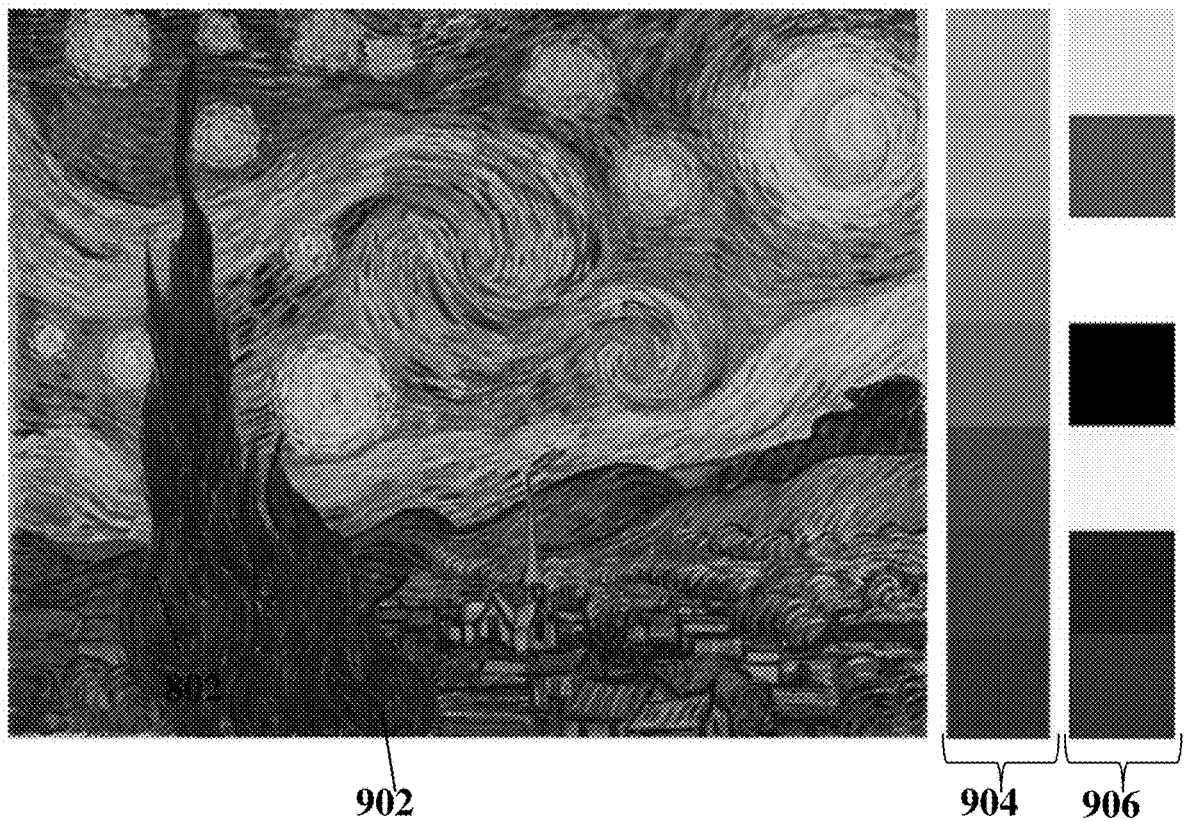
FIG. 9 shows discrete colors generated from an input image using conventional tools, according to an embodiment.

Embodiments disclosed herein provide significantly better results than conventional color extraction algorithms. As understood in the art, conventional color extraction algorithms merely extract discrete colors, and do not generate a playful palette. For comparison, two conventional algorithms, Chang (Huiwen Chang, Ohad Fried, Yiming Liu, Stephen DiVerdi, and Adam Finkelstein, Palette-based Photo Recoloring, *ACM Trans. Graph.* 34, 4, Article 139 (July 2015)) and Tan (Jianchao Tan, Jyh-Ming Lien, and Yotam Gingold, Decomposing Images into Layers via RGB-Space Geometry, *ACM Trans. Graph.* 36, 1, Article 7 (November 2016)), both extract discrete colors from test images. For example, FIG. 9 shows an image 902, Van Gogh's "Starry Night," a first set of discrete colors 904 generated by Chang, and a second set of discrete colors 906 generated by Tan. As shown, both the first and second sets of discrete colors 904, 906 are not playful palettes but just the colors extracted from the image 902.

To compare the results of the embodiments herein, playful palettes were generated from a set of 56 images, with 44 photographs from the MIT-Adobe-FiveK dataset (Vladimir Bychkovsky, Sylvain Paris, Eric Chan, and Frdo Durand, Learning Photographic Global Tonal Adjustment with a Database of Input/Output Image Pairs, *The Twenty-Fourth IEEE Conference on Computer Vision and Pattern Recognition* (2011)) and 12 paintings from Google Arts & Culture (Google, Google Arts & Culture (2018). Available at https://artsandculture.google.com/). The playful palettes were generated using an optimization (OPT) method and an approximation (SOM) method. Because both Chan and Tan do not generate playful palettes, but rather a set of discrete colors (e.g., colors 904, 906), overlapping blobs were created from these discrete colors.

Color gamuts derived from the results of the each of the above methods were visualized, and the objective functions comparing the images and the corresponding results were calculated, as well. The color gamuts were shown as 3D plots inside a unit cube, viewed down the cube diagonal (luminance gradient from black to white). The objective function was calculated as a minimum Euclidean distance between a color in an input image and the corresponding playful palette image (in case of Chang and Tan, the images of the overlapping blobs).

Figure 13:
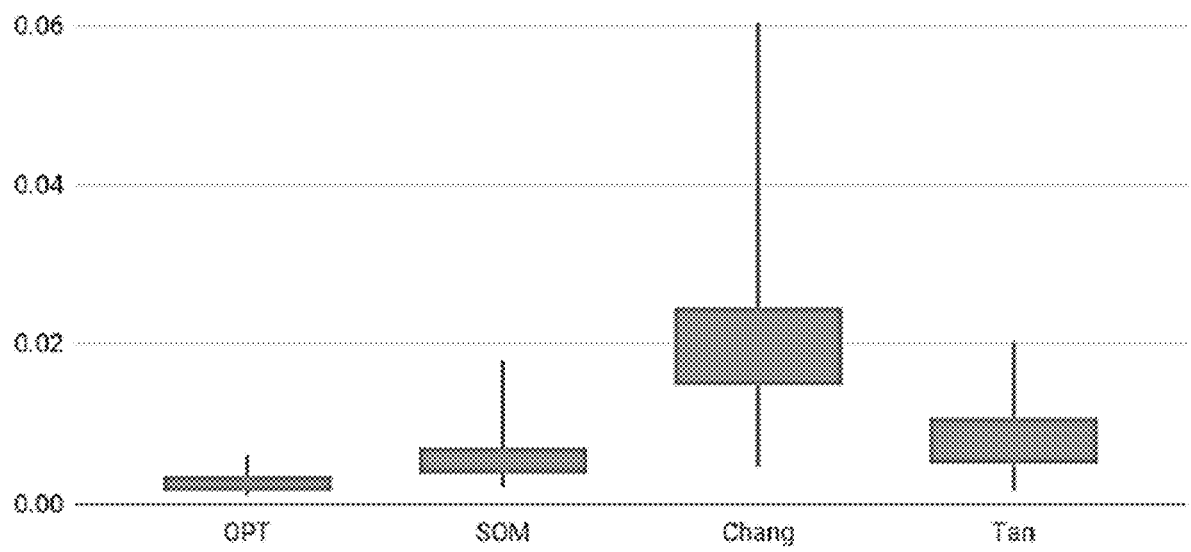
FIG. 13. shows results comparing the first illustrative method, the second illustrative method, and the first and second conventional methods, according to an embodiment.

In the comparison, all method were made to produce seven blobs, as seven was the maximum number of blobs that Chang could produce. Across all the 56 images, the optimization method (OPT) achieved a mean objective value of $\mu$=0.0027 (SD (standard deviation)=0.0012), the approximation method (SOM) $\mu$=0.0059 (SD=0.0029), Chang $\mu$=0.0202 (SD=0.0102), and Tan $\mu$=0.0084 (SD=0.0046). FIG. 13 shows these results visually.

As seen in FIG. 13, the optimization method (OPT) receives best results from among each of the four methods. The approximation method (SOM) is also better than Tan, and significantly better than Chang.

Figure 10A:
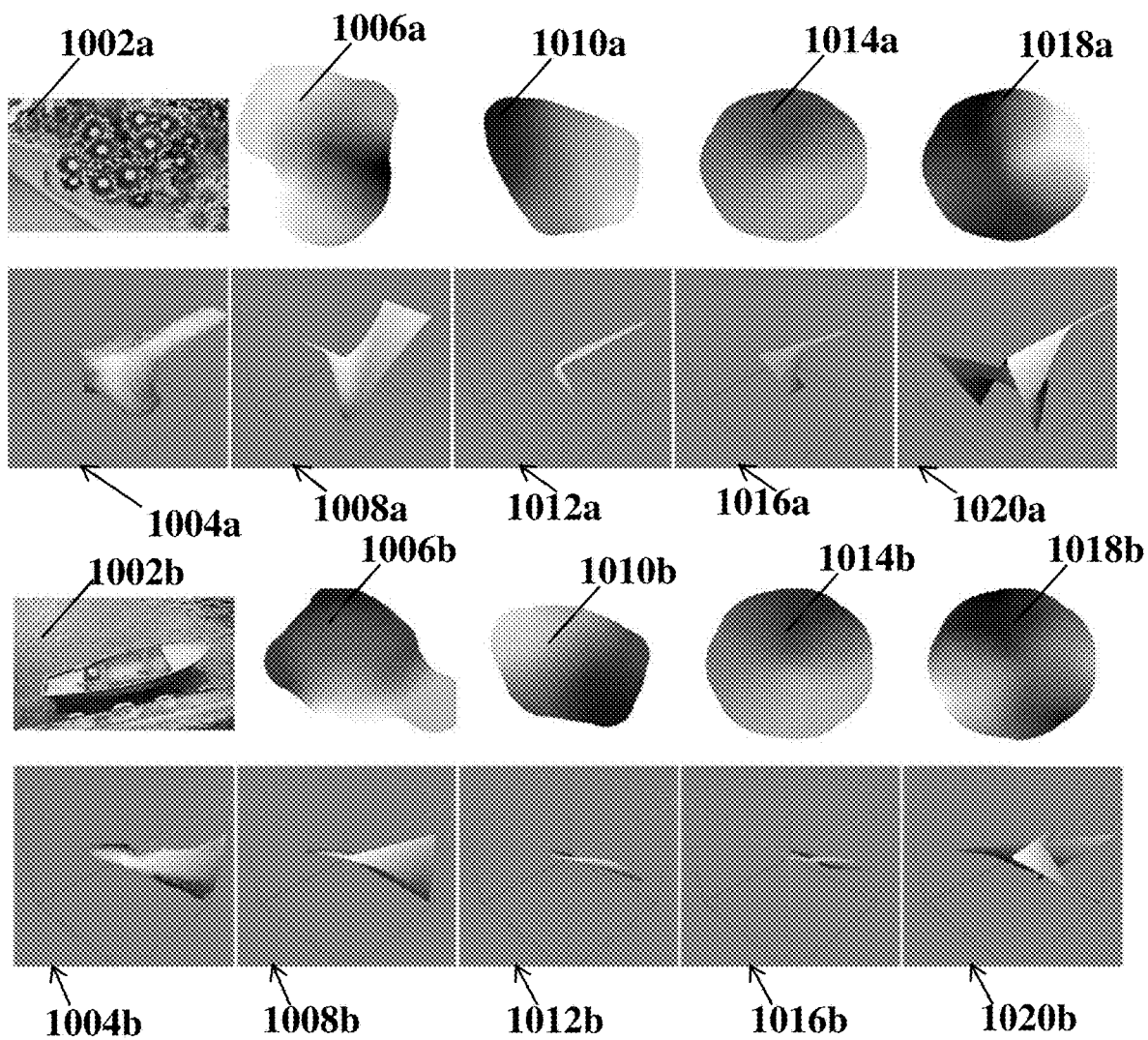
FIGS. 10A-10C show playful palettes and their corresponding three dimensional color gamuts generated by the first and second illustrative methods, according to an embodiment and further show palettes generated using a first and second conventional methods and their corresponding three dimensional color gamuts.
Figure 10C:
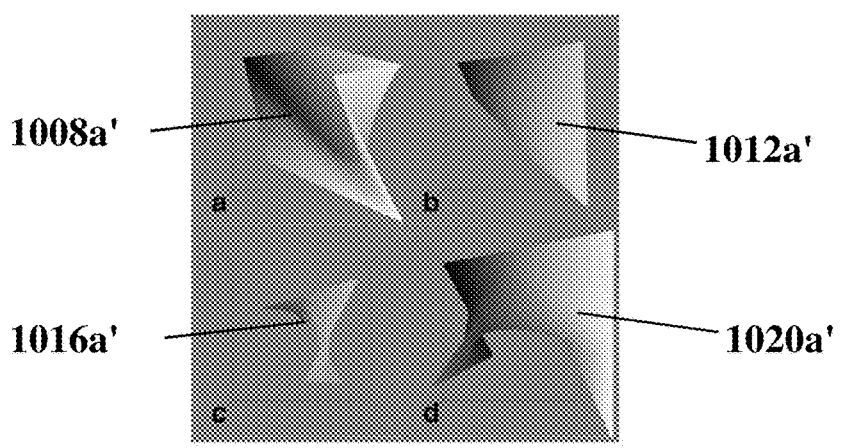
Figure 10B:
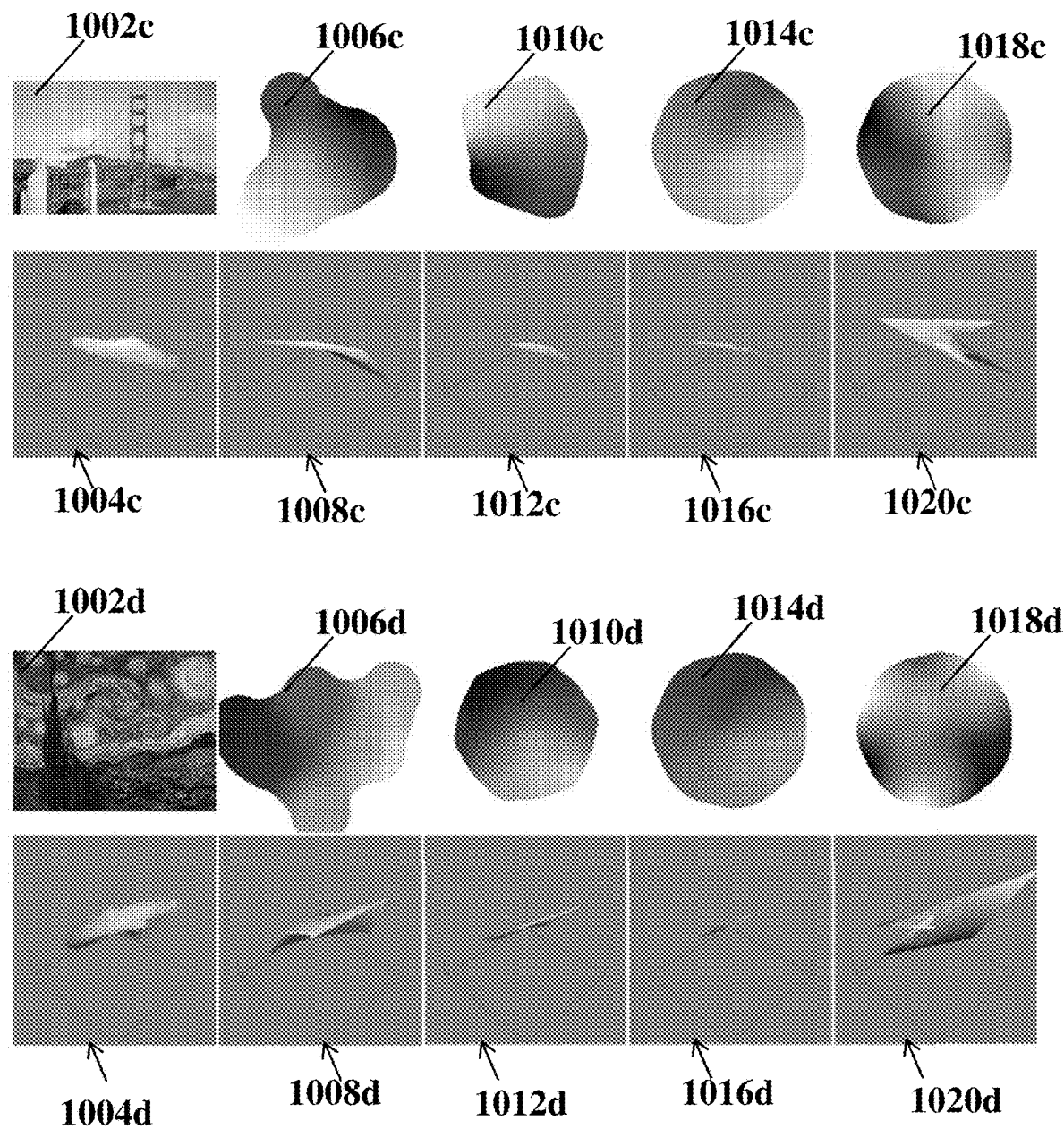

FIGS. 10A-10B show input images 1002a-1002d (collectively referred to as 1002), corresponding playful palettes 1006a-1006d (collectively referred to as playful palettes 1006) generated using the optimization method and corresponding playful palettes 1010a-1010d (collectively referred to as playful palettes 1010) generated using the approximation method. FIGS. 10A-10B also show palettes 1014a-1014d (collectively referred to as palettes 1014) generated using the Chang method, and palettes 1018a-1018d (collectively referred to as palettes 1018) using the Tan method. FIGS. 10A-10B further show 3D color histograms for input images 1002 and the generated palettes 1006, 1010, 1014, 1018. As shown, 3D color histograms 1004a-1004d (collectively referred to as 3D color histograms 1004) may correspond to the input image 1002, 3D color histograms 1008a-1008d (collectively referred to as 3D color histograms 1008) may correspond to the playful palettes 1006, 3D color histograms 1012a-1012d may correspond to the playful palettes 1010, 31) color histograms 1016a-1016d (collectively referred to as 3D color histograms 1016) may correspond to the palettes 1014, 3D color histograms 1020a-1020d (collectively referred to as 3D color histograms 1020) may correspond to the palettes 1018.

FIG. 10C shows alternative views of the 3D histograms of the palettes for input image 1002a. The 3D histograms show a red axis and blue axis, and a green axis is orthogonal to the red and blue axes. A black region is located in the upper left of the 3D histogram. 3D histogram 1008a' may correspond to the playful palette 1006a and therefore may be an alternate view of 3D histogram 1008a. 3D histogram 1012a' may correspond to the playful palette 1010a and therefore may be an alternate view of 3D histogram 1012a. 3D histogram 1016a' may correspond to the palette 1014a and therefore may be an alternate view of 3D histogram 1016a.

And, 3D histogram 1020*a*' may correspond to the palette 1018*a* and therefore may be alternate view of 3D histogram 1020*a*'.

As shown in FIGS. 10A-10C, the optimization method may effectively choose palette colors that are around the edges of the color gamut to represent as many colors as possible without including too many extraneous colors. The approximation method may capture the luminance variation in an image that can be seen in the 3D histograms shown in FIG. 10C. However, the palettes generated from the conventional Tan and Chang methods produce more limited palettes than other methods. Because Tan uses a simplified convex hull, Tan tends to create palettes that include colors that often lay outside the gamut of the image pixels in order to contain them inside the hull volume. As a result, Tan's palettes often appear "too colorful" for the image, and the gamuts are very large. Chang on the other hand consistently produces color gamuts that are too conservative, missing may important image colors and generally being low contrast, as a result of Chang using a clustering approach that selects as palette colors as centroids of the image color clusters. These centroids are by definition at the center of the clusters, so there are portions of the clusters that are outside the resulting color gamut.

Figure 11:
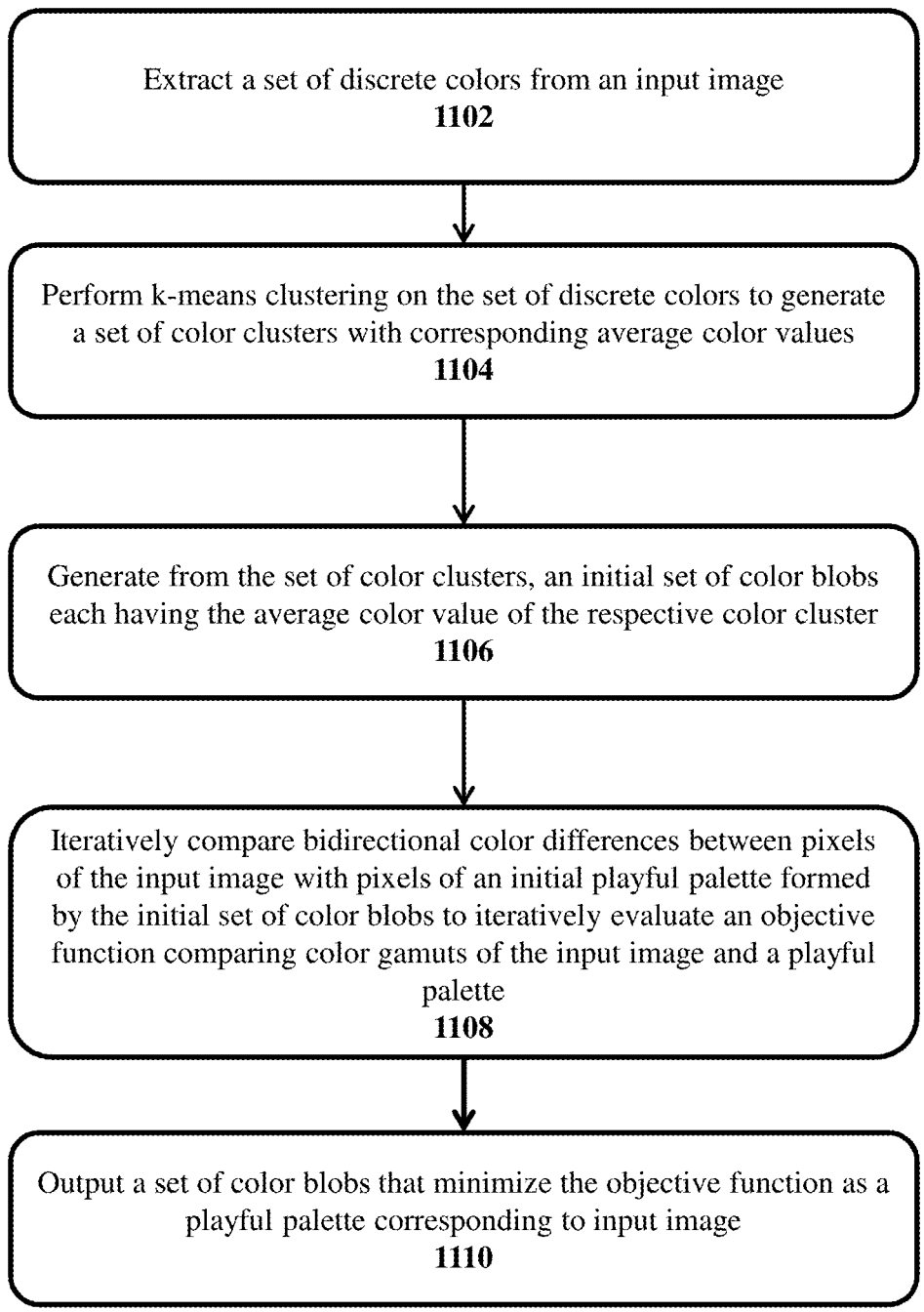
FIG. 11 shows a flow diagram of a first illustrative method of generating a playful palette from an input image, according to an embodiment.

FIG. 11 shows a flow diagram 1100 of a first illustrative method of generating playful palettes from an input image, according to an embodiment. Although multiple computers, multiple software modules, and multiple databases may implement one or more steps of the method, this description details, for brevity, the steps being implemented by a computer. Furthermore, the steps shown in the flow diagram 1100 are merely illustrative, and additional steps or alternative steps should be considered within the scope of this disclosure. Furthermore, one or more of the steps may be skipped during the implementation of the method.

The method may begin at step 1102, where the computer may extract a set of discrete colors from an input image. At step 1104, the computer may perform k-means clustering on the set of discrete colors to generate a set of color clusters with corresponding average color values. At step 1106, the computer may generate from the set of color clusters, an initial set of color blobs each having the average color value of the respective color cluster. At step 1108, the computer may iteratively compare bidirectional color differences between pixels of the input image with pixels of an initial playful palette formed by the initial set of color blobs to iteratively evaluate an objective function comparing color gamuts of the input image and a playful palette. In each iteration, the computer may determine whether a respective set of color blobs minimize the objective function. If the respective set of color blobs do not minimize the objective function, the computer may generate a new set of color blobs by modifying a position or a color of at least one color blob. If the respective set of color blobs minimize the objective function, the computer may output the respective set of colors blobs as a playful palette corresponding to the input image at step 1110.

Figure 12:
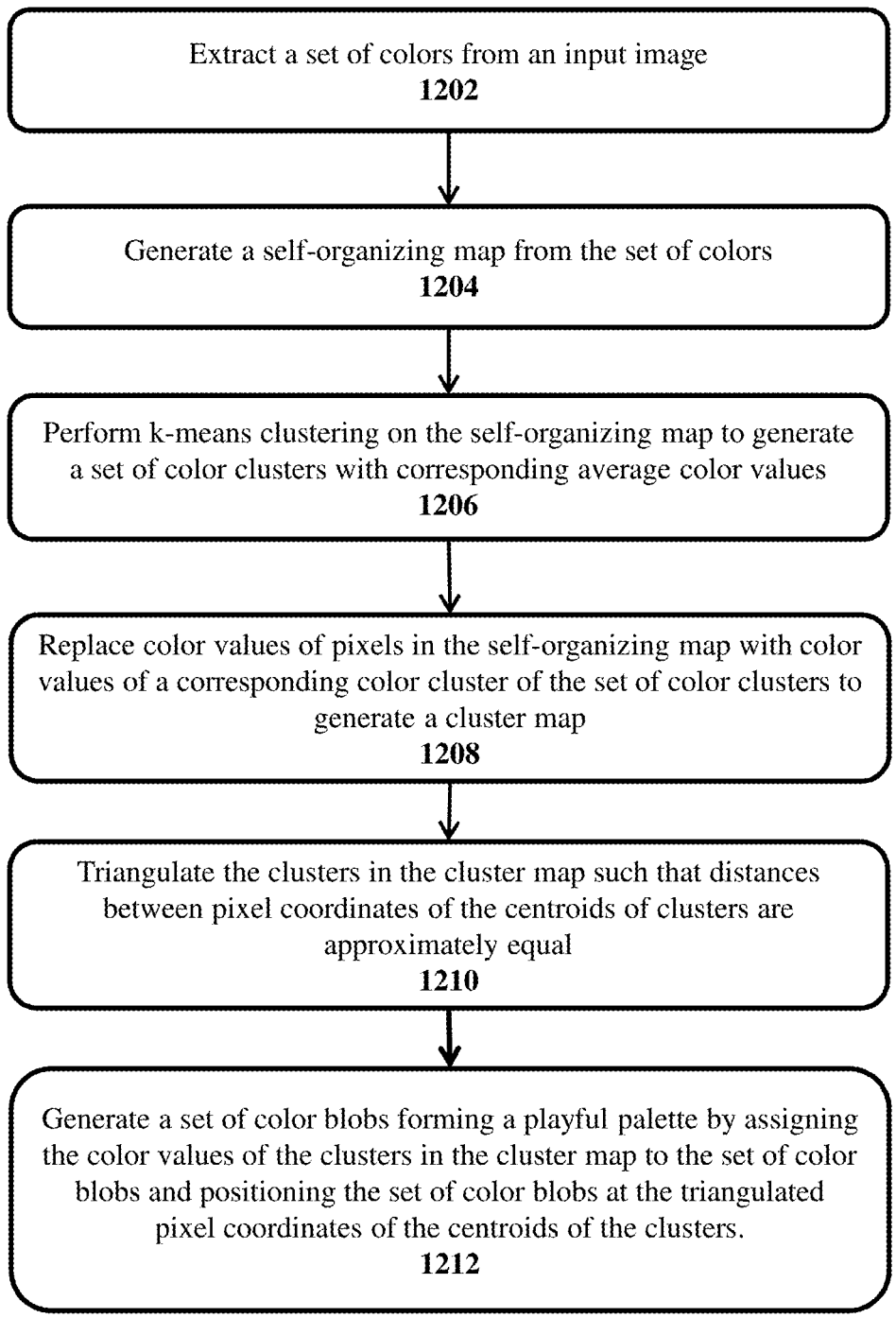
FIG. 12 shows a flow diagram of a second illustrative method of generating a playful palette from an input image, according to an embodiment.

FIG. 12 shows a flow diagram 1200 of a second illustrative method of generating playful palettes from an input image, according to an illustrative embodiment. Although multiple computers, multiple software modules, and multiple databases may implement one or more steps of the method, this description details, for brevity, the steps being implemented by a computer. Furthermore, the steps shown in the flow diagram 1200 are merely illustrative, and additional steps or alternative steps should be considered within the scope of this disclosure. Furthermore, one or more of the steps may be skipped during the implementation of the method.

The method may begin at step 1202, where the computer may extract a set of colors from an input image. At step 1204, the computer may generate a self-organizing map from the set of colors. At step 1206, the computer may perform k-means clustering on the self-organizing map to generate a set of color clusters with corresponding average color values. At step 1208, the computer may replace color values of pixels in the self-organizing map with color values of a corresponding color cluster of the set of color clusters to generate a cluster map. At step 1210, the computer may triangulate the clusters in the cluster map such that distances between pixel coordinates of the centroids of clusters are approximately equal. At step 1212, the computer may generate a set of color blobs forming a playful palette by assigning the color values of the clusters in the cluster map to the set of color blobs and positioning the set of color blobs at the triangulated pixel coordinates of the centroids of the clusters.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   extracting, by a computer, a set of discrete colors from an input image, wherein the set of discrete colors are extracted for generating a playful palette;
   based on extracting the set of discrete colors, automatically generating, by the computer, the playful palette from the set of discrete colors, the playful palette containing a gamut limited to a blend of the set of discrete colors; and
   displaying, by the computer, a representation of the playful palette on a graphical user interface.

2. The method of claim 1, further comprising:
   performing, by the computer, clustering on the set of discrete colors to generate a set of color clusters with corresponding average color values;
   generating, by the computer from the set of color clusters, an initial set of color blobs each having the average color value of the respective color cluster;
   iteratively comparing, by the computer, bidirectional color differences between pixels of the input image with pixels of an initial playful palette formed by the initial set of color blobs to iteratively evaluate an objective function comparing color gamuts of the input image and the initial playful palette, each iteration including:
   modifying, by the computer, a position or a color of at least one color blob of the respective set of color blobs to generate a new set of color blobs forming a new playful palette in response to the computer determining that a respective set of color blobs do not minimize the objective function; and
   identifying, by the computer, the respective set of color blobs as the playful palette corresponding to the input image in response to the computer determining that the respective set of color blobs minimizes the objective function.

3. The method of claim 2, wherein the color blobs in the initial set of color blobs are overlapping.

4. The method of claim 2, further comprising:
   receiving, by the computer, an input number from a user indicating the number of color blobs to be generated; and
   performing, by the computer, clustering to generate the set of color clusters with a number of color clusters matching the input number.

5. The method of claim 2, further comprising:
   receiving, by the computer, a length number from a user indicating a radius of at least one color blob in the playful palette; and
   generating, by the computer, the initial set of color blobs wherein at least one color blob in the initial set of color blobs has a radius of the length number.

6. The method of claim 2, wherein iteratively comparing further includes:
   rendering, by the computer, a corresponding playful palette image formed by respective set of color blobs at a predetermined resolution;
   subsampling, by the computer, a subset of discrete colors of the set of discrete colors by selecting colors from non-zero bins from a three dimensional histogram of the colors of the input image; and
   calculating, by the computer, bidirectional distances between pixels of the subset of discrete colors and respective pixels in the corresponding playful palette image to evaluate the objective function.

7. The method of claim 2, wherein the objective function comprises a first term comparing the pixel color values of the input image with respective pixel color values of a corresponding playful palette and a second term comparing pixel color values of the corresponding playful palette with respective pixel color values of the input image.

8. The method of claim 7, wherein the first term is scaled by a first factor and the second term is scaled by a second factor.

9. A computer-implemented method comprising:
extracting, by a computer, a set of discrete colors from an input image;
generating, by the computer, a self-organizing map from the set of discrete colors;
performing, by the computer, clustering on the self-organizing map to generate a set of color clusters with corresponding average color values;
replacing, by the computer, color values of pixels in the self-organizing map with color values of a corresponding color cluster of the set of color clusters to generate a cluster map;
triangulating, by the computer, the clusters in the cluster map such that distances between pixel coordinates of the centroids of clusters are approximately equal; and
generating, by the computer, a set of color blobs forming a playful palette by assigning the color values of the clusters in the cluster map to the set of color blobs and positioning the set of color blobs at the triangulated pixel coordinates of the centroids of the clusters, the playful palette containing a gamut limited to a blend of the set of discrete colors.

10. The method of claim 9, wherein extracting the set of discrete colors from the input image comprises:
selecting, by the computer, the set of colors from non-zero histogram bins of a uniform three dimensional color histogram of the input image.

11. The method of claim 9, wherein the triangulation is Delaunay triangulation.

12. The method of claim 9, wherein the clustering is k-means clustering.

13. The method of claim 9, further comprising:
receiving, by the computer, an input number from a user indicating the number of color blobs to be generated; and
performing, by the computer, the clustering to generate the set of color clusters with a number of color clusters matching the input number.

14. The method of claim 9, further comprising:
receiving, by the computer, a length number from a user indicating a radius of at least one color blob in the playful palette; and
generating, by the computer, the set of color blobs wherein at least one color blob in the initial set of color blobs has a radius of the length number.

15. The method of claim 9, wherein the average color values are selected from the group consisting of red-green-blue (RGB) values and cyan-magenta-yellow-key (CMYK) values.

16. The method of claim 9, wherein the set of color blobs includes at least a pair of adjacent blobs with overlapping portions.

17. A system comprising:
a non-transitory storage medium storing an input image;
a processor coupled to the non-transitory storage medium and programmed to execute a set of instructions to:
extract a set of discrete colors from the input image;
generate an initial set of color blobs from a set of generated color clusters having corresponding average color values;
generate a final set of color blobs; and
automatically generate, using the final set of color blobs, a playful palette from the set of discrete colors, the playful palette containing a gamut limited to a blend of the set of discrete colors.

18. The system of claim 17, wherein the processor is further configured to generate the set of color clusters by performing clustering on the set of discrete colors.

19. The system of claim 17, wherein the processor is further configured to provide for display, a representation of the playful palette on a graphical user interface.

20. The system of claim 17, wherein the processor is further configured to initialize an objective function with the initial set of color blobs; and generate the final set of color blobs that optimizes the objective function, wherein the objective function is iteratively evaluated to minimize the objective function.

\* \* \* \* \*